2 Sheets--Sheet 1.

J. A. T. OVEREND.

Type-Casting Machine.

Reissued June 22, 1875.

No. 6,505.

Witnesses

Geo. H. Strong

Jno. L. Boone

Inventor

John A. T. Overend by Dewey & Co

Attys

THE NORRIS PETERS CO., WASHINGTON, D. C.

J. A. T. OVEREND.

Type-Casting Machine.

No. 6,505. Reissued June 22, 1875.

Witnesses
Geo. H. Strong.
Jno. L. Boone

Inventor
John A. T. Overend
by Dewey & Co
Attys

THE NORRIS PETERS CO., WASHINGTON, D. C.

UNITED STATES PATENT OFFICE.

JOHN A. T. OVEREND, OF SAN FRANCISCO, CALIFORNIA.

IMPROVEMENT IN TYPE-CASTING MACHINES.

Specification forming part of Letters Patent No. 136,091, dated February 18, 1873; reissue No. 6,505, dated June 22, 1875; application filed May 13, 1875.

DIVISION A.

*To all whom it may concern:*

Be it known that I, JOHN ALFRED THOMAS OVEREND, of the city and county of San Francisco, State of California, have invented a Machine for Casting, Breaking, and Rubbing Movable Type; and I do hereby declare the following description and accompanying drawings are sufficient to enable any person skilled in the art or science to which it most nearly appertains to make and use my said invention without further invention or experiment.

The object of my invention is to provide a machine for casting movable type, and then conveying them directly from the matrix and mold to another part of the mechanism, by which the type are broken from the stem and rubbed or cleaned and smoothed of any irregular projecting edges which may have been formed in casting, the whole operation being continuous, and requiring no power but that required to drive the machine.

Figure 1:
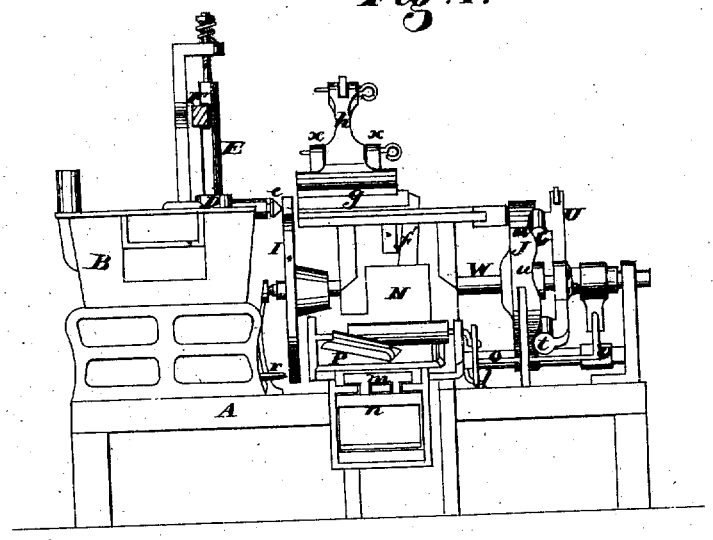
Figure 3:
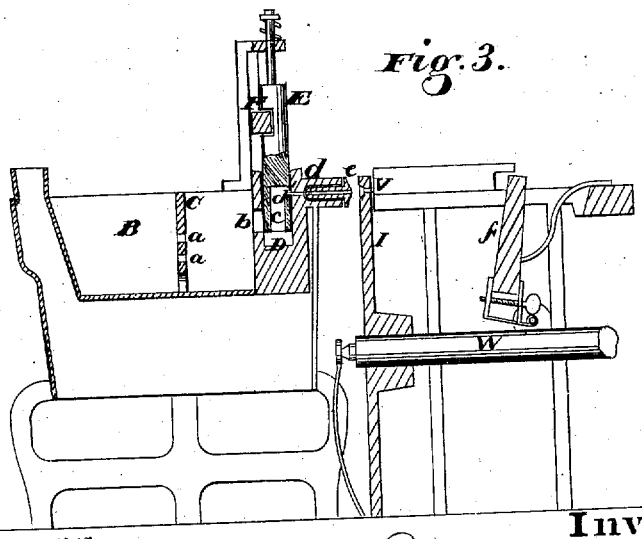
Figure 2:
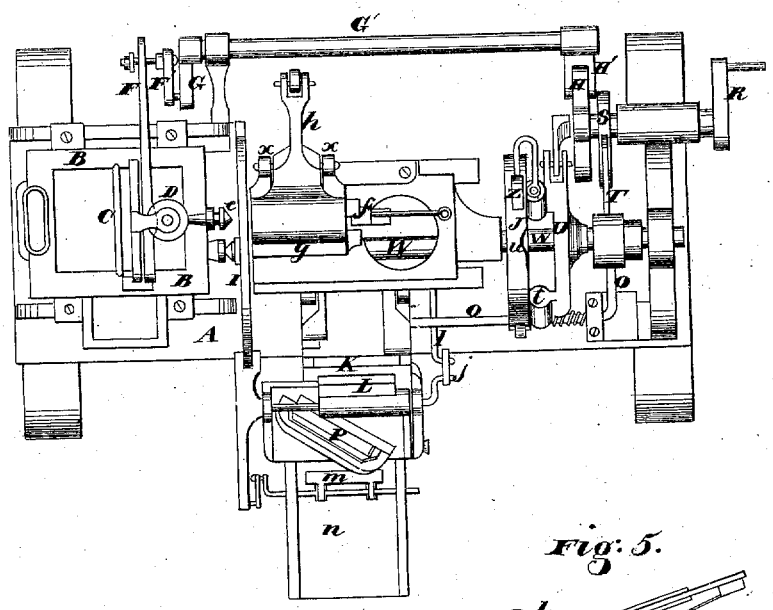
Figure 5:
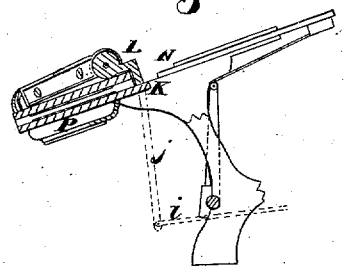
Figure 4:
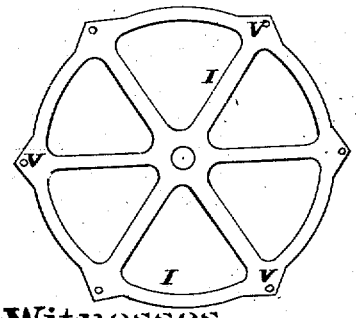

Referring to the accompanying drawing for a more complete explanation of my invention, Figure 1 is a side elevation of the machine. Fig. 2 is a top view or plan. Fig. 3 is an enlarged sectional view of a part of the machine. Fig. 4 is a view of the carrier. Fig. 5 is a vertical longitudinal section, showing the sliding plate N, clamp L, and rubbers P P.

A is a frame or bed, upon which the machinery is placed. B is a melting-pot of any suitable construction, and provided with appliances for cleansing the metal from impurities before it reaches the pump.

Any suitable form of pump may be used; but I prefer to employ a pump of my own invention, which is more fully described in Division B of this reissue.

A self-adjusting nozzle *e*, connects the pumps with the matrix *f*, into which the metal is ejected to form the type. The mold has an automatically opening and closing upper part, so that the type will be released at the proper time and removed by the carrier I.

In order to hold the type and convey it to the rubber after it is made, the carrier I is interposed between the nozzle and the mold.

This carrier consists of six or other number of arms, either separated or united by a rim, so as to form a wheel, and it revolves in a plane at right angles with the plane of the mold. A small hole, *v*, is made in the end of each of the carrier-arms, and when the machine is in motion one of these holes is stopped opposite the nozzle at each movement. The mold being closed, and the matrix in place, these, with the carrier, are given a side movement by a cam, J, which brings them closely against the nozzle, and makes a tight joint throughout. At this instant the piston moves in the pump-cylinder and ejects a small portion of the melted metal, which is forcibly thrown into the mold and matrix, thus forming a type.

After the type is formed, the carrier-mold and matrix are allowed to move away from the nozzle by a side movement from the cam, as before described, the mold opens, and at the same instant the carrier moves forward, taking the type with it. In the present case the second movement of the carrier lays the type with its side on an inclined table, K, when a clamp, L, is brought down and holds the type. The clamp is operated by the arms *k'* and *l*, and a connecting-rod, *j*, from the shaft M, as shown. As soon as the clamp has seized the type a sliding plate, N, is moved forward by an arm from the shaft O, and this plate forces the type between the rubbers P, which are placed angularly in the table K, one above and one below the type. These rubbers are for the purpose of smoothing off any little rough edges which may be left in casting. The moving of the sliding plate N also breaks the type from its holding-stem, so that it is all ready for use. As the carrier continues to revolve the holes in the arms are brought opposite a short pin, *r*, near the bottom of the machine, and when the side movement of the carrier I takes place for making the joint this pin enters a hole and forces out the stem which is left after breaking the type. This leaves the arm free and all ready for another type when it arrives at the proper place. A short shaft, operated by a pulley or the crank R, drives the machine. The shaft G is operated by the cam H on this shaft, as before described. Another cam, S, on the same shaft operates an arm, T, which is keyed to the shaft M, giving it an oscillating motion, and from this shaft M the mechanism which opens and closes the mold is driven; also, the device for operating the cam L. Above the shaft M is the shaft W, extending parallel with it and driving the carrier I, which is keyed to the shaft W. This shaft has an end motion for closing the joint through which the metal passes, as before described, and has the cam J keyed to it. An arm, U, is placed loosely on the shaft W, and has friction-rollers *t t* at each end, which bear against the side face of the cam. In this face are depressions *u*, and when the rollers *t* fit into these depressions the end movement of the shaft allows the carrier I and the mold to move away from the nozzle; but when the rollers rest on the higher part of the face the joint will be closed. The edge of the cam is formed into a ratchet, and by means of a pawl, *z*, on the arm U, the cam and shaft are rotated with the necessary intermittent movement.

The cutters or rubbers P are made self-clearing, being formed, like planes, with a throat, and they are set at an angle with the table, and also with each other, so as to form a V or an X shape as they stand.

The different mechanism for operating the parts is clearly shown in the accompanying drawing; but I do not wish to confine myself to the especial devices shown for this purpose, as it will be manifest to any skilled person that many different arrangements of mechanism might be employed and the same results obtained; but What I do claim, and desire to secure by Letters Patent is—

1. The sliding plate N, arranged as described, so as to carry the type between the rubbers P P, in combination with the carrier I, clamp L, and table K, constructed and operated substantially as and for the purpose set forth.

2. The cam J and the arm U, constructed and operated substantially as described, for the purpose of giving the carrier I, the mold *g* and the matrix *f* a side movement, and making a tight joint.

J. A. T. OVEREND.

Witnesses:
GEO. H. STRONG,
J. L. BOONE.